(12) United States Patent
Rao

(10) Patent No.: US 8,798,636 B2
(45) Date of Patent: Aug. 5, 2014

(54) METHOD AND APPARATUS FOR CARRIER SELECTION AND SCHEDULING IN WIRELESS SYSTEMS

(75) Inventor: Anil M. Rao, Wheaton, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 62 days.

(21) Appl. No.: 13/073,109

(22) Filed: Mar. 28, 2011

(65) Prior Publication Data
US 2012/0252477 A1     Oct. 4, 2012

(51) Int. Cl.
*H04W 72/04*        (2009.01)
(52) U.S. Cl.
USPC ....................................... 455/452.1; 370/252
(58) Field of Classification Search
CPC ..... H04W 28/04; H04W 28/22; H04W 48/16; H04W 72/02; H04W 72/082; H04W 72/1231
USPC ............... 455/411, 450, 452.1, 522; 370/252, 370/312, 332
See application file for complete search history.

(56) References Cited

U.S. PATENT DOCUMENTS

| | | | |
|---|---|---|---|
| 2008/0102822 A1* | 5/2008 | Feng et al. | 455/425 |
| 2009/0163208 A1 | 6/2009 | Rao | |
| 2010/0182972 A1 | 7/2010 | Katayama | |
| 2010/0322094 A1* | 12/2010 | Allpress et al. | 370/252 |
| 2011/0310753 A1* | 12/2011 | Chou et al. | 370/252 |

OTHER PUBLICATIONS

PCT/US2012/027859 "Notification of Transmittal of the Int'l Search Report and the Written Opinion of the Int'l Searching Authority, or the Delegation" dated Mar. 6, 2012.

* cited by examiner

*Primary Examiner* — Sam Bhattacharya
(74) *Attorney, Agent, or Firm* — Harness, Dickey & Pierce

(57) ABSTRACT

Various methods and devices are provided to address the need for improved multicarrier system operation. In one method, an indication of a received signal power level at a UE (user equipment) is received (501) from the UE. A carrier is then selected (502) on which to schedule the UE. The carrier is selected from a group of carriers based on the indication of the received signal power level at the UE.

13 Claims, 5 Drawing Sheets

| Parameter | Assumption |
|---|---|
| Network topology | Multicell cloverleaf (12 sites / 36 sectors with wrap-around) |
| System Bandwidth | 10 MHz |
| Carrier Frequency | 700 MHz and AWS (2100 MHz DL /1700 MHz UL) |
| Path Loss Model for 700 MHz | Hata suburban model with 30m eNB antenna height, 1.5m UE antenna height; Path Loss (dB) = 114.2 + 35.2log10(d_km) |
| Path Loss Model for AWS | COST-231 suburban model with 30m eNB antenna height, 1.5m UE antenna height; Path Loss Downlink (dB) = 138.5 + 35.2log10(d_km) Path Loss Uplink (dB) = 135.3 + 35.2log10(d_km) |
| Site-to-site distance | 2.0 km |
| Shadow fading | σ=8 dB, site-to-site correlation = 0.5 |
| BS antenna | 17 dBi antenna gain; pattern: 70 deg.@ 3 dB beamwidth, 20 dB max. attenuation |
| Cable loss/Body loss | Cable loss=3 dB, Body loss=1dB (data terminal) |
| Penetration Loss | 10 dB |
| BS noise figure | 4 dB |
| UE noise figure | 8 dB |
| BS Tx power / DL CRS power | 40 Watts (46 dBm) total transmit power DL CRS transmit power = 18.2 dBm / RE |
| Mobile antenna | Omnidirection, -1 dBi antenna gain |
| Max. Mobile power | 23 dBm |
| Antenna configuration | 1 Tx, 2 Rx for UL, 2 Tx, 2Rx for DL |
| Fading Channel Profile | Extended Pedestrian B, 3km/hr |
| Implementation Margin | 0.5 dB |
| Scheduler | LA3.0 frequency selective scheduler for UL, LA2.0 for DL; max of 5 HARQ Tx with 10% initial BLER Fractional power control utilized with α=0.7, min target SINR = 0 dB, max target SINR = 15 dB |
| MIMO Mode for DL | TxDiv |
| Traffic Model | Full Buffer |

FIG. 2

| | Conventional Carrier Selection | RSRP-based Carrier Selection with 50% AWS and 50% 700 MHz |
|---|---|---|
| Aggregate Cell Throughput (Mbps) AWS + 700 MHz | 11.0 Mbps | 11.7 Mbps |
| 5% CDF User Throughput (kbps) AWS + 700 MHz | 70 kbps | 350 kbps |

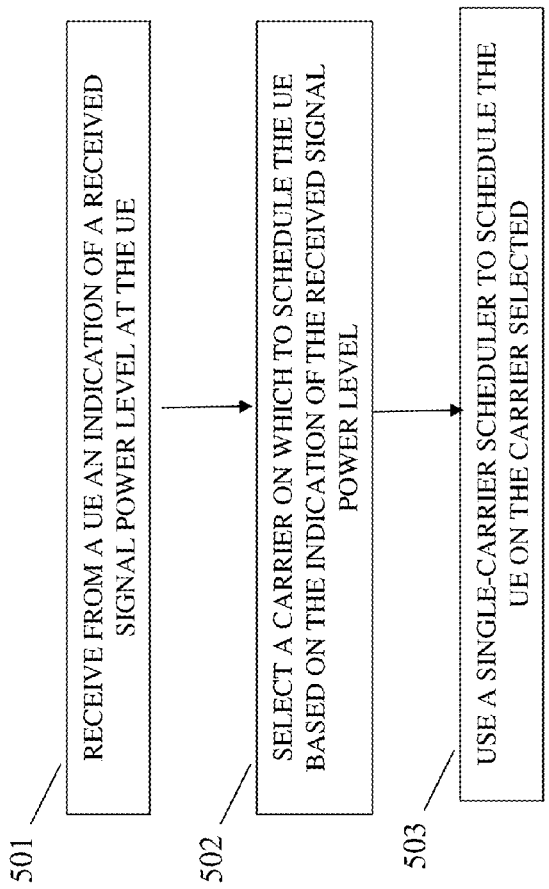

METHOD AND APPARATUS FOR CARRIER SELECTION AND SCHEDULING IN WIRELESS SYSTEMS

FIELD OF THE INVENTION

The present invention relates generally to communications and, in particular, to carrier selection scheduling in wireless communication systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

Operators deploying LTE often have several different frequency bands at their disposal, for example 700 MHz and the 2100 MHz Downlink/1700 MHz Uplink band (referred to as the Advanced Wireless Services (AWS) band in the United States. An operator would be interested in deploying full nationwide coverage on the lower carrier frequency due to its better propagation characteristics, hence requiring fewer cell sites. However, as spectrum at the higher frequencies becomes available for LTE, the operator would be interested in deploying a 1:1 overlay on top of the lower frequency network, so as to avoid adding extra cell sites. The higher carrier frequency will have reduced coverage compared to the lower carrier frequency, meaning users who connect to the higher carrier frequency will experience very low data rates at the edge of the cell. Given that LTE is meant to provide high data rates over the entire cell coverage area so as to enable a new set of applications to be used (e.g., video calling), a simple 1:1 overlay may not meet the requirements of the operator.

One feature being developed as part of LTE Release-10 is the ability to support carrier aggregation (CA), which is the ability to aggregate 2 or more LTE carriers (called component carriers) together to form one large effective carrier, even if the carriers are in different frequency bands. The mobile devices will be able to simultaneously receive data and control signaling as well as make measurements on multiple component carriers on the downlink, as well as transmit on multiple component carriers simultaneously. The use of carrier aggregation can provide a performance benefit, but it also implies a significant increase in the complexity of the schedulers at the base station, for both uplink and downlink.

Thus, new solutions and techniques that are able to address one or more of the issues encountered in multicarrier systems would meet a need and advance wireless communications generally.

BRIEF DESCRIPTION OF THE DRAWINGS

FIG. 2 is a table illustrating the basic simulation setup used to evaluate various embodiments of the present invention.

FIG. 3 is a table illustrating the performance of an RSRP-based carrier selection approach as compared to a conventional carrier selection approach.

FIG. 5 is a logic flow diagram of functionality performed by a network node in accordance with various embodiments of the present invention.

Figure 1:
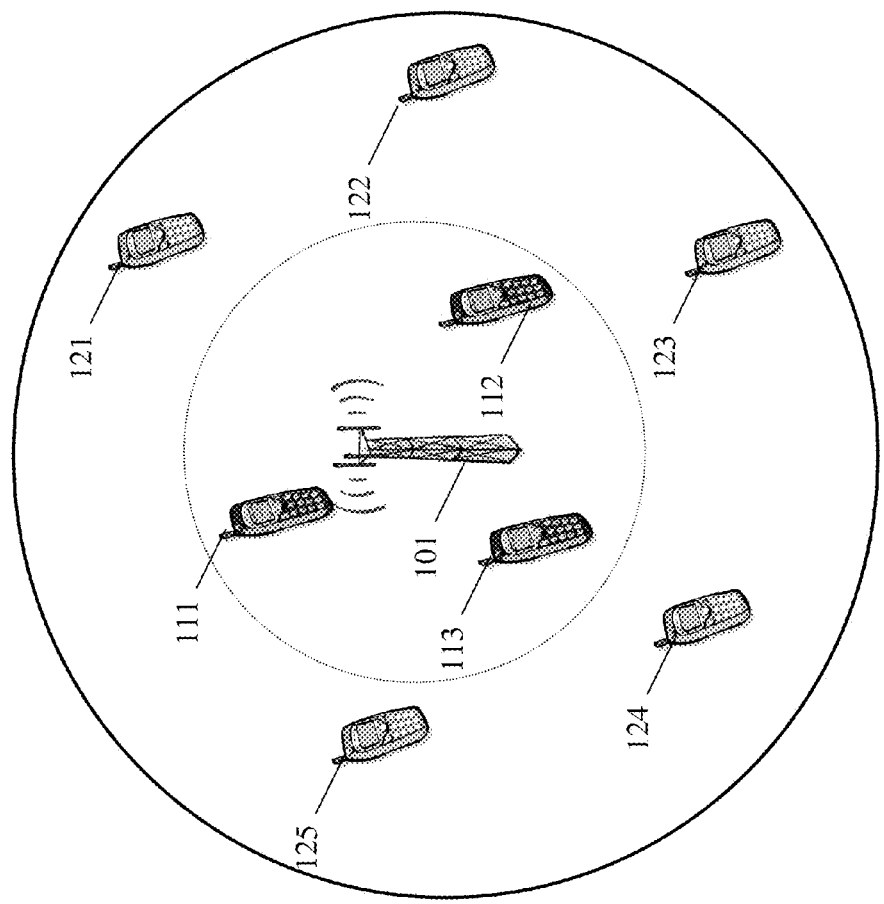
FIG. 1 is a illustration depicting a group of mobile devices being served by a base station in accordance with various embodiments of the present invention.

Specific embodiments of the present invention are disclosed below with reference to FIGS. 1-5. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY OF THE INVENTION

Various methods and devices are provided to address the need for improved multicarrier system operation. In one method, an indication of a received signal power level at a UE (user equipment) is received from the UE. A carrier is then selected on which to schedule the UE. The carrier is selected from a group of carriers based on the indication of the received signal power level at the UE. An article of manufacture is also provided, the article comprising a processor-readable storage medium storing one or more software programs which when executed by one or more processors performs the steps of this method.

Many embodiments are provided in which the method above is modified. For example, in many embodiments the indication of the received signal power level comprises an indication of a reference signal received power (RSRP) level at the UE. This indication of a RSRP level at the UE may comprise an event notification. For example, such an event may indicate that the RSRP level at the UE has become higher than a first threshold level or that the RSRP level at the UE has become lower than a second threshold level. Also, in some embodiments, the first threshold level and the second threshold level may be equal, while in other embodiments they may be assigned different values.

In embodiments in which the group of carriers includes a lower-frequency carrier and a higher-frequency carrier, selecting the carrier on which to schedule the UE may involve selecting the lower-frequency carrier when the indication of the received signal power level indicates that the received signal power level is below a threshold level and/or selecting the higher-frequency carrier when the indication of the received signal power level indicates that the received signal power level is above a threshold level. In embodiments in which event notifications are used, selecting the carrier on which to schedule the UE may involve selecting the higher-frequency carrier when the event notification indicates that the RSRP level at the UE has become higher than the first threshold level and/or selecting the lower-frequency carrier when the event notification indicates that the RSRP level at the UE has become lower than the second threshold level.

In many embodiments, the UE is then scheduled on the carrier selected. In some embodiments, this scheduling involves using a single-carrier scheduler to schedule the UE on the carrier selected.

A network node apparatus is also provided. The network node being configured to communicate with other devices of a system and being operative to receive from user equipment (UE) an indication of a received signal power level at the UE and to select a carrier, from a plurality of carriers, on which to schedule the UE based on the indication of the received signal power level at the UE. Many embodiments are provided in which this network node is modified. Examples of such embodiments can be found described above with respect to the method.

DETAILED DESCRIPTION OF EMBODIMENTS

To provide a greater degree of detail in making and using various aspects of the present invention, a description of our approach to improving the operation of multicarrier systems and a description of certain, quite specific, embodiments follows for the sake of example. FIGS. 1-4 are referenced in an attempt to illustrate some examples of specific interference problems and specific embodiments of the present invention.

The approach taken in many of the embodiments described below involves utilizing the single carrier scheduling algorithms which have already been developed for LTE Release-8 compliant base stations, while still providing a performance benefit from the carrier aggregation framework. In this approach, a carrier selection technique is proposed that is applicable to LTE Release-10 mobiles capable of supporting carrier aggregation. The single carrier scheduling algorithms can be re-used, but the assignment of mobiles to a particular carrier is done in an intelligent way so as to avoid the case of a user experiencing low data rates at a cell edge.

The idea is to exploit the fact that mobiles capable of supporting carrier aggregation can simultaneously make measurements on multiple carrier frequencies, providing the scheduler information on which is the most suitable carrier frequency to schedule the mobile on. This can be done without the inter-frequency handoff techniques which are required in previous versions of the LTE standard (Release-8 and Release-9). It is proposed that long-term reference signal received power (RSRP) reports from the mobiles made on 2 carriers be used to determine which carrier frequency the mobile gets assigned to. In this way, we can ensure that devices relatively close to the base station get assigned to the higher carrier frequency while devices far away from the cell site get assigned the lower carrier frequency.

In today's conventional network deployment, there may be several carriers in a given market, and these carriers may be in different bands (e.g., 1700 MHz and 700 MHz). To move users between carriers, a four step process is used:

(1) eNB commands UE to start inter-frequency measurements using measurement gaps. (The triggering mechanism is vendor specific.)

(2) UE finds P-SCH peaks, identifies cell with S-SCH and DL RS and reports measurements to eNB. (The 3GPP requirement for cell identification is <5 seconds per TS 36.133.)

(3) eNB sends inter-frequency handover command to UE. (The SRB can be sent over HSDPA to improve latency.)

(4) UE performs physical channel reconfiguration and goes through synchronization procedure before transmitting on new carrier. (Interruption time plus open-loop power control correction is ~100 ms per TS 36.133.)

The most lengthy step in the process is step 2, in which the mobile terminal goes through a "cell identification" process in order to identify a suitable candidate cell on the new carrier frequency; according to 3GPP specifications this step can take as much as 5 seconds to perform. The cell identification process requires the mobile terminal to perform correlation operations on the Primary Synchronization CHannel (P-SCH) and then the Secondary Synchronization CHannel (S-SCH).

Given the lengthy inter-frequency handover procedure, algorithms which try to optimize system performance by moving users to different carriers in a given market cannot typically exploit user location information, given that the user location may have significantly changed by the time the inter-frequency handover is performed. As such, the assignment of users to carriers is not based on user location. It is rather based on things like service class (e.g., put all voice users on one carrier, data users on another carrier), or on the need to balance the load between carriers (roughly equal number of users on 2 carriers in a given market). The problem with this approach is that mobiles located at the edge of the cell may be assigned the higher carrier frequency (the AWS carrier, in this example), which can result in very low data rates, particularly on the uplink, as we see in our simulation study.

As discussed above, carrier aggregation (CA) is being introduced into the 3GPP LTE Release-10 specification whereby the mobile terminal will be able to listen to and receive data simultaneously on multiple carrier frequencies. In various embodiments, we exploit the carrier aggregation framework to allow for a fast assignment of the user to one of the carrier frequencies. Note that we will not allow a user to be scheduled simultaneously on multiple carriers, as that would result in an increase in scheduler complexity. Instead, our approach enables us to reuse the single carrier schedulers which have already been developed, but come up with an intelligent way to assign mobiles to a particular carrier. Note that mobiles that support carrier aggregation have already identified multiple carriers, therefore we can assign the mobile to a scheduler which is in charge of scheduling users on one of the carriers very quickly, enabling the lengthy cell identification step in the conventional inter-frequency handover to be skipped (step 2 above).

Furthermore, we propose that RSRP (reference signal received power) reports from the mobile be used to make a decision as to which carrier frequency the user will get assigned to as far as base station scheduling is concerned. The RSRP provides an indication as to how far the mobile is from the base station; if the RSRP measurement is above a threshold value, it gets assigned to the higher carrier frequency (e.g., the AWS carrier), and if it is below a threshold value, it gets assigned to the lower carrier frequency (e.g., the 700 MHz carrier).

FIG. 1 is a illustration depicting an example of such a situation. The idea is that when a mobile is close to the base station 101 it is assigned to the higher carrier frequency, in this case the AWS carrier. Thus, mobiles 111-113 are assigned to the higher frequency carrier. As a mobile moves away from the base station, the RSRP will decrease, and when it crosses a certain threshold the mobile will be re-assigned to the scheduler in charge of making assignments on the 700 MHz carrier. Thus, mobiles 121-125 are assigned to the lower frequency carrier. The advantage compared to the prior art is that no lengthy inter-frequency handover mechanism is required here, only a simple re-assignment of the mobile to the proper scheduler, which all may take place inside the base station.

The basic steps in one of the RSRP-based carrier selection approaches we propose are as follows; we assume without loss of generality that the mobile is connected to two carriers:

1. Higher layer signaling is used to configure event triggered reporting of RSRP by the mobile on one of the carrier frequencies. Without loss of generality, let us assume this is on the lower carrier frequency (e.g., 700 MHz). The 3GPP standard currently supports what is known as Event A1 and Event A2 reporting. Event A1 means the RSRP on the serving cell has become higher than a particular threshold, and Event A2 means the RSRP on the serving cell has become lower than a particular threshold. Note that the RSRP measurements in the mobile are filtered and there are hysteresis parameters which are allowed to avoid ping-ponging between these two events. We choose to configure an RSRP threshold, call it RSRP_THRESHOLD_LOW_BAND to use for both Event A1 and Event A2.
2. If the base station receives Event A1 from the mobile (meaning the RSRP has gone above the RSRP_THRESHOLD_LOW_BAND) and the mobile is currently assigned to the scheduler in charge of the lower carrier frequency (e.g., 700 MHz), then the mobile is re-assigned to the scheduler in charge of the higher carrier frequency (e.g., AWS).
3. If the base station receives Event A2 from the mobile (meaning the RSRP has dropped below the RSRP_THRESHOLD_LOW_BAND) and the mobile is currently assigned to the scheduler in charge of the higher carrier frequency (e.g., AWS), then the mobile is re-assigned to the scheduler in charge of the lower carrier frequency (e.g., 700 MHz).

The choice of RSRP_THRESHOLD_LOW_BAND is used to create the coverage zone boundary between the high carrier frequency zone and the low carrier frequency zone (e.g., the inner zone verses the outer zone depicted in illustration 100).

Table 200 of FIG. 2 illustrates the basic simulation setup (i.e., the macro system level assumptions) used to evaluate the proposed RSRP-based carrier assignment embodiment. Table 300 of FIG. 3 illustrates the performance of an RSRP-based carrier selection approach as compared to a conventional carrier selection approach, which we assume here is based on simple load balancing between the two carriers without any regards to the RSRP of the user; that is, carrier selection is not based on user location. We drop 5 mobiles at random locations in the cell and assign them the AWS carrier, and another 5 mobiles at random location in the cell and assign them the 700 MHz carrier. Considering these 10 mobiles together, the aggregate cell throughput and the cell edge data rate (defined as the 5% point of the user throughput CDF (cumulative distribution function)) is shown. Here we see the poor cell edge data rate of 70 kbps can be a problem for many of the more advanced applications which are expected to be run on an LTE network.

Next, we used the RSRP-based carrier selection idea, where we configured the RSRP threshold such that the inner 50% of the cell area is assigned to the AWS band and the outer 50% of the cell area is assigned to 700 MHz. In this case we see that the cell edge rate improves by a factor of 5 to 350 kbps.

Figure 4:
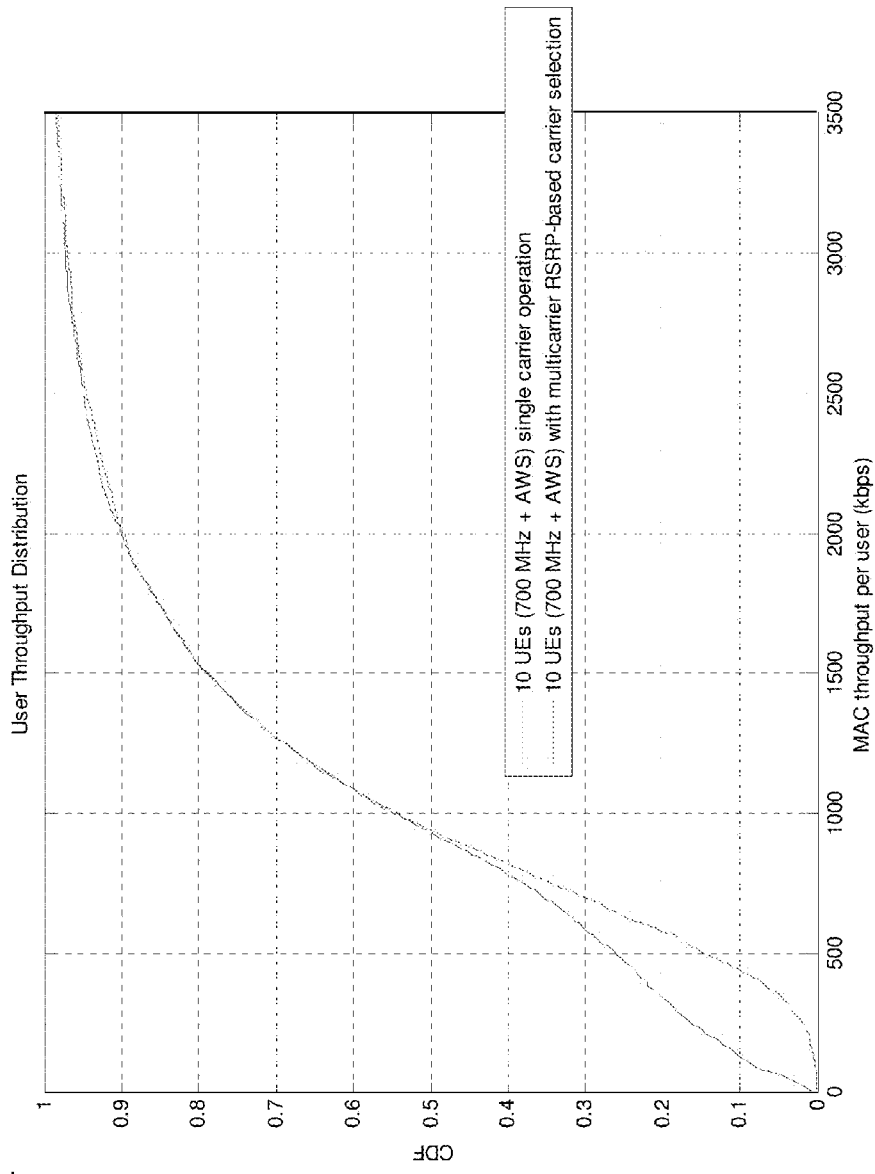
FIG. 4 is a graph comparing user throughput CDFs for an RSRP-based carrier selection approach and a conventional carrier selection approach.

Moreover, graph 400 of FIG. 4 compares the user throughput CDFs for an RSRP-based carrier selection approach and a conventional carrier selection approach. Note the 5 times improvement in cell edge rate.

Thus, the embodiments described above enable the use of already developed and tested single carrier schedulers, adding relatively little additional processing to determine which user gets assigned to which scheduler (one scheduler for the 700 MHz carrier, one scheduler for the AWS carrier). These embodiments are also able to provide some significant performance benefits, particularly at cell edges.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

Aspects of embodiments of the present invention can be understood with reference to FIG. 5. Diagram 500 of FIG. 5 is a logic flow diagram of functionality performed by a network node in accordance with various embodiments of the present invention. In the method depicted in diagram 500, a network node receives (501) from user equipment (UE) an indication of a received signal power level at the UE. The network node then selects (502) a carrier, from a plurality of carriers, on which to schedule the UE based on the indication of the received signal power level at the UE. In many embodiments, the UE is then scheduled (503) on the carrier selected. In some embodiments, this scheduling involves using a single-carrier scheduler to schedule the UE on the carrier selected.

Many embodiments are provided in which the method above is modified. For example, in many embodiments the indication of the received signal power level (such as in 501) comprises an indication of a reference signal received power (RSRP) level at the UE. This indication of a RSRP level at the UE may comprise an event notification. For example, such an event may indicate that the RSRP level at the UE has become higher than a first threshold level or that the RSRP level at the UE has become lower than a second threshold level. Also, in some embodiments, the first threshold level and the second threshold level may be equal, while in other embodiments they may be assigned different values.

In embodiments in which the group of carriers includes a lower-frequency carrier and a higher-frequency carrier, selecting the carrier on which to schedule the UE (such as in 502) may involve selecting the lower-frequency carrier when the indication of the received signal power level indicates that the received signal power level is below a threshold level and/or selecting the higher-frequency carrier when the indication of the received signal power level indicates that the received signal power level is above a threshold level. In embodiments in which event notifications are used, selecting the carrier on which to schedule the UE may involve selecting the higher-frequency carrier when the event notification indicates that the RSRP level at the UE has become higher than the first threshold level and/or selecting the lower-frequency carrier when the event notification indicates that the RSRP level at the UE has become lower than the second threshold level.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method for carrier selection, the method comprising:
    receiving, by a base station, from user equipment (UE) an indication of a received signal power level at the UE;
    selecting, by the base station, a carrier, from a plurality of carriers, on which to schedule the UE based on the indication of the received signal power level at the UE; and
    scheduling, by the base station, the UE on the carrier selected, wherein,
        the plurality of carriers comprises a lower-frequency carrier and a higher-frequency carrier, and
        the selecting a carrier on which to schedule the UE includes selecting the lower-frequency carrier when the indication of the received signal power level indicates that the received signal power level is below a first threshold level.

2. The method as recited in claim 1, wherein scheduling the UE comprises:
    using a single-carrier scheduler to schedule the UE on the carrier selected.

3. The method as recited in claim 1, wherein the indication of the received signal power level comprises an indication of a reference signal received power (RSRP) level at the UE.

4. The method as recited in claim 3, wherein the indication of a RSRP level at the UE comprises an event notification that indicates at least one of,
    that the RSRP level at the UE has become higher than a second threshold level, and
    that the RSRP level at the UE has become lower than a third threshold level.

5. The method as recited in claim 4, wherein the second threshold level and the third threshold level are equal.

6. The method as recited in claim 4,
    wherein selecting the carrier on which to schedule the UE includes,
        selecting the higher-frequency carrier when the event notification indicates that the RSRP level at the UE has become higher than the second threshold level, and
        selecting the lower-frequency carrier when the event notification indicates that the RSRP level at the UE has become lower than the third threshold level.

7. An article of manufacture comprising a non-transitory, processor-readable storage medium storing one or more software programs which when executed by one or more processors performs the steps of the method of claim 1.

8. A network node of a communication system, the network node being configured to communicate with other devices in the system, wherein the network node is operative
    to receive from user equipment (UE) an indication of a received signal power level at the UE;
    to select a carrier, from a plurality of carriers, on which to schedule the UE based on the indication of the received signal power level at the UE; and
    to schedule the UE on the carrier selected, wherein,
        the plurality of carriers comprises a lower-frequency carrier and a higher-frequency carrier, and
        being operative to select the carrier on which to schedule the UE includes being operative to select the lower-frequency carrier when the indication of the received signal power level indicates that the received signal power level is below a first threshold level.

9. The network node as recited in claim 8, wherein being operative to schedule the UE comprises being operative to use a single-carrier scheduler to schedule the UE on the carrier selected.

10. The network node as recited in claim 8, wherein the indication of the received signal power level comprises an indication of a reference signal received power (RSRP) level at the UE.

11. The network node as recited in claim 10, wherein the indication of a RSRP level at the UE comprises an event notification that indicates at least one of,
    that the RSRP level at the UE has become higher than a second threshold level, and
    that the RSRP level at the UE has become lower than a third threshold level.

12. The network node as recited in claim 11, wherein the second threshold level and the third threshold level are equal.

13. The network node as recited in claim 11,
    wherein being operative to select the carrier on which to schedule the UE includes,
        being operative to select the higher-frequency carrier when the event notification indicates that the RSRP level at the UE has become higher than the second threshold level, and
        being operative to select the lower-frequency carrier when the event notification indicates that the RSRP level at the UE has become lower than the third threshold level.

* * * * *